United States Patent [19]
Vargady

[11] 3,769,608
[45] Oct. 30, 1973

[54] ULTRA HIGH FREQUENCY MECHANICAL Q-SWITCH

[75] Inventor: Leslie O. Vargady, Glendora, Calif.

[73] Assignee: The United States of America as represented by the Secretary of the Air Force, Washington, D.C.

[22] Filed: May 17, 1972

[21] Appl. No.: 254,143

[52] U.S. Cl. .............................. 331/94.5 Q, 350/285
[51] Int. Cl. ................................................ H01s 3/10
[58] Field of Search .................... 331/94.5; 350/160, 350/285

[56] References Cited
UNITED STATES PATENTS
3,487,331  12/1969  Gates ................................. 331/94.5
3,548,337  12/1970  Gates et al. ........................ 331/94.5

Primary Examiner—William L. Sikes
Attorney—Harry A. Herbert, Jr. et al.

[57] ABSTRACT

A Q-switch for use in the optical system of a laser which achieves a high repetition rate by using a central rotating reflector and a single spherical reflector. If the intersection of the axis of rotation and surface of the central reflector is exactly on the center of the spherical reflector, a beam entering on the axis of rotation and focused on the spherical reflector will be constantly retro-reflected while the central reflector rotates about its rotational axis.

10 Claims, 4 Drawing Figures

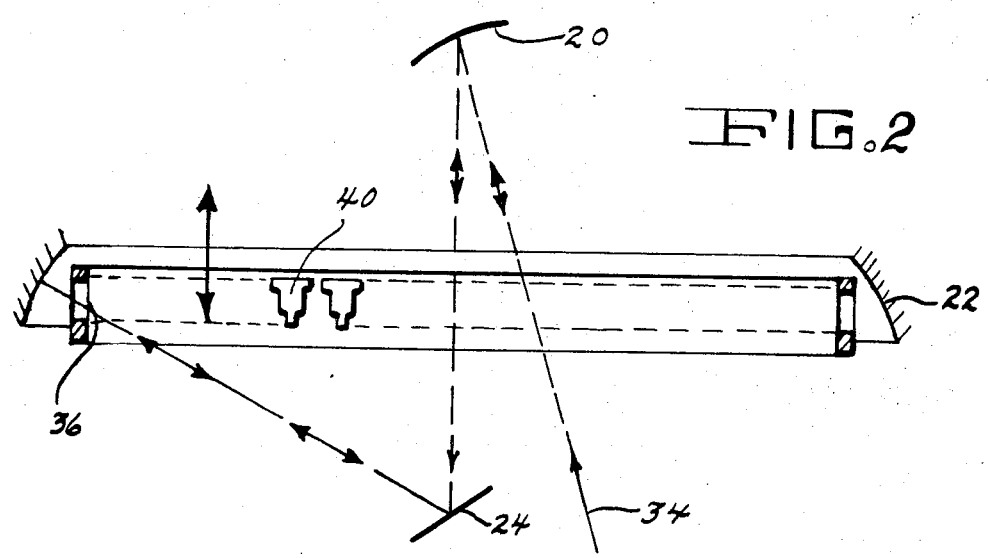
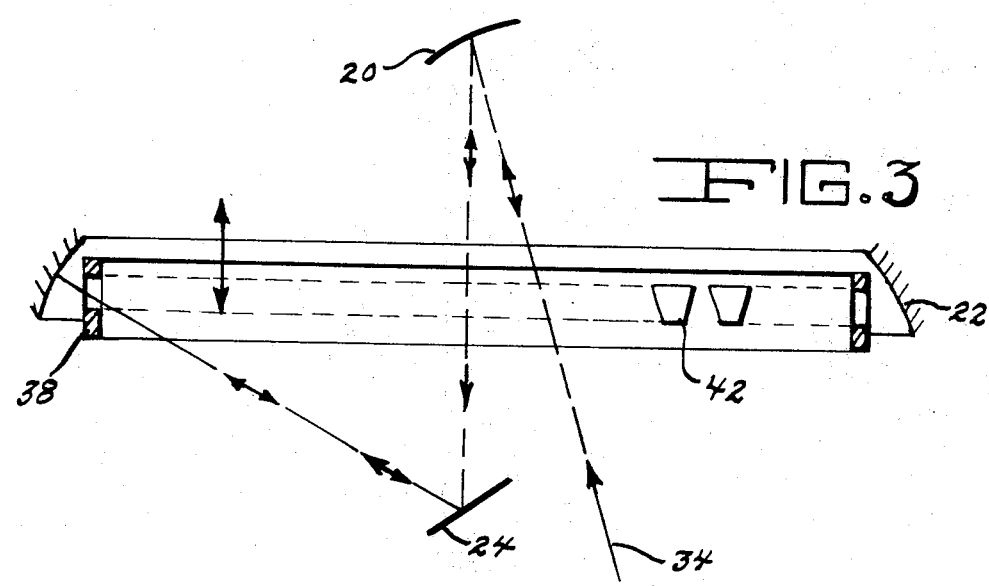
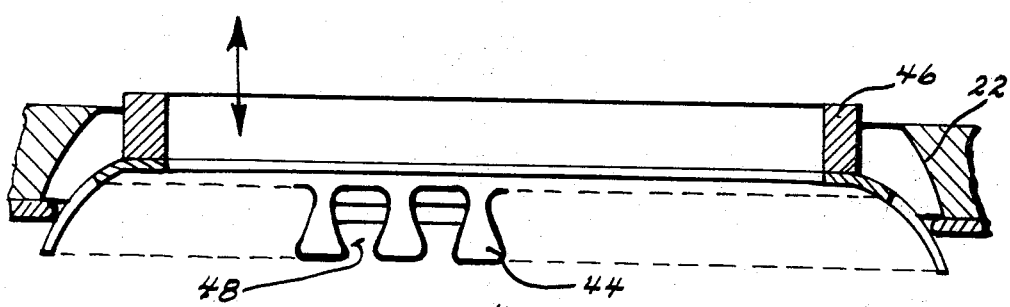

ULTRA HIGH FREQUENCY MECHANICAL Q-SWITCH

BACKGROUND OF THE INVENTION

This invention relates generally to lasers, and, more particularly, to a ultra high frequency mechanical Q-switch for use therewith.

It has been suggested to use lasers for a wide diversity of activities ranging from communication over great distances to the drilling of very accurate holes in objects. Many such uses require a very large amount of focused electromagnetic energy, especially where it is desired to damage or destroy an object at a distance by focusing a large amount of energy on a small area.

Lasers are now established in the art for generating coherent electromagnetic radiation in the optical frequency range. The operation of a laser is based upon the fact that the atomic systems represented by the atoms of the laser material can exist in any of a series of discrete energy level or states, the systems absorbing energy in the optical frequency range in going to a higher state and emitting it when going to a lower state. In the case of ruby as a laser material, three energy levels are utilized. The atomic systems are raised from the lower or ground level to the higher of the three levels by irradiation from a strong light source which need not be coherent but should preferably have a high concentration of energy in the absorbing wavelengths. A radiationless transition then occurs from the highest state to an intermediate or metastable state. This is followed by a transition with photon emission from the intermediate state back to the ground state. It is the last transition that is of interest since this transition is the source of the coherent light or electromagnetic energy produced by the laser.

The operation of raising the energy level of the laser material to produce the desired photon emission is referred to in the art as "pumping" and when more atoms reach an excited metastable state than remain in a lower energy level, a "population inversion" is said to exist.

The active material in the laser is made optically resonant by placing reflectors at either end thereof. Reflectors external to the laser material may be used but in the case of solid materials, such as ruby rod, each end of the rod may be mirrored. The reflector on at least one end of the material is made partially transmissive so that there will be an escape from the resonant chamber.

A measure of the sharpness of the resonance is referred to as Q. Thus, when the system is made resonant, it is said to have a high Q, and when nonresonant, a low Q. In a resonant system, the optical resonant cavity of the laser will pick up some of the light that results from the fluorescence or the spontaneous transition with photon emission from the metastable state back to the ground state and resonant modes will be established which further stimulate emission to build up an electromagnetic wave. As the pumping means raises the population of atoms in the excited state to inversion, stimulated emission proceeds to deplete the population to below that of the spontaneous decay threshold. One method of exceeding the threshold of population inversion is to interrupt the resonant cavity until pumping has greatly exceeded inversion and then suddenly restore the Q or resonant cavity. If stimulated emission is retarded in this way until a very high level of inversion is reached a narrow pulse of high power can be generated. This method is referred to as Q switching or spoiling.

Q-switching in the optical system of the laser is normally accomplished by means of a light shutter placed between the ruby rod and one of the reflecting surfaces, or by rotating out of alignment means comprising, for example, a rotating prism or mirror which serves as the fully reflective surface for one end of the crystal. The repetition rate of mechanical Q-switching is inherently limited by difficulties arising from the mass of components rotated at high speed. For example, if a 100 KHz repetition rate is desired, a 300 sided polygon has to be rotated at 50,000 RPM.

In another method of Q-switching the laser beam is focused to a diffraction limited spot, and directed through a series of small holes arranged on a circle in a rotating disc. Here again, for high frequencies a high number of holes are required, therefore a large mass with high inertia is rotated at high speed.

SUMMARY OF THE INVENTION

The instant invention sets forth a mechanical Q-switching which overcomes all the problems set forth in detail hereinabove.

The Q-switch of the instant invention utilizes a central rotating reflector and a single spherical reflector. In this invention the intersection of the axis of rotation and the surface of the rotating relfector is exactly on the center of the spherical reflector surface. Therefore, a beam emanating from a laser source entering on the axis of rotation of the rotating reflector and focused on the spherical reflector, will be constantly retro-reflected while the rotating reflector spins around the axis of rotation. With the spherical surface interrupted by masks or slots, a multi reflector device is produced. This array of reflectors is easily lined up since each reflector is part of a single spherical surface.

To adjust the dwelling time on a reflector without changing the repetition rate a ring shaped mask having regularly spaced openings around its circumference is slideably secured adjacent the spherical reflector. The width of these openings is varying in the form of steps, slopes or triangular configurations allowing incremental or continuous change of the dwelling time, as represented by the effective width of the openings as the mask is axially displaced.

It is therefore an object of this invention to provide a Q-switch for use in the optical system of a laser which produces an extremely high repetition rate.

It is another object of this invention to provide a Q-switch for use in the optical system of a laser which permits an adjustable dwelling time on the reflector without changing the repetition rate.

It is still another object of this invention to provide a Q-switch for use in the optical system of a laser which is economical to produce and which utilizes conventional currently available components that lend themselves to standard mass producing manufacturing techniques.

For a better understanding of the present invention together with other and further objects thereof, reference is made to the following description taken in connection with the accompanying drawing and its scope will be pointed out in the appended claims.

DESCRIPTION OF THE DRAWING

FIG. 2 is side elevational view shown partly in cross-section of the ring shaped mask utilized with the Q-switch of the instant invention; and FIG. 3 is a side elevational view shown partly in cross-section of a modified ring shaped mask utilized with the Q-switch of the instant invention.

FIG. 4 is a side elevational view shown partially in cross section of another modified ring shaped mask utilized with the Q-switch of the instant invention. DETAILED DESCRIPTION OF THE PREFERRED EMBODIMENT Reference is now made to FIG. 1 of the drawing which shows in detail the Q-switch 10 of this invention which is used in the optical system of a laser 12. The Q-switch is made up of an outer housing 14 having upper and lower sections 16 and 18, respectively. These sections may be fixedly secured together by conventional fasteners 19 or may be in the form an integral structure. Upper section 16 adjustably supports a focusing reflector 20 as well as a spherical reflector 22 while the lower section 18 supports a central rotating reflector 24 as well as the entrance reflector 26 and any suitable laser source 12. It should be noted, however, that although the structure set forth in FIG. 1 may be preferred, the configuration of the housing 14 as well as the exact position of the laser source 12 may be varied within the scope of the instant invention.

Figure 1:
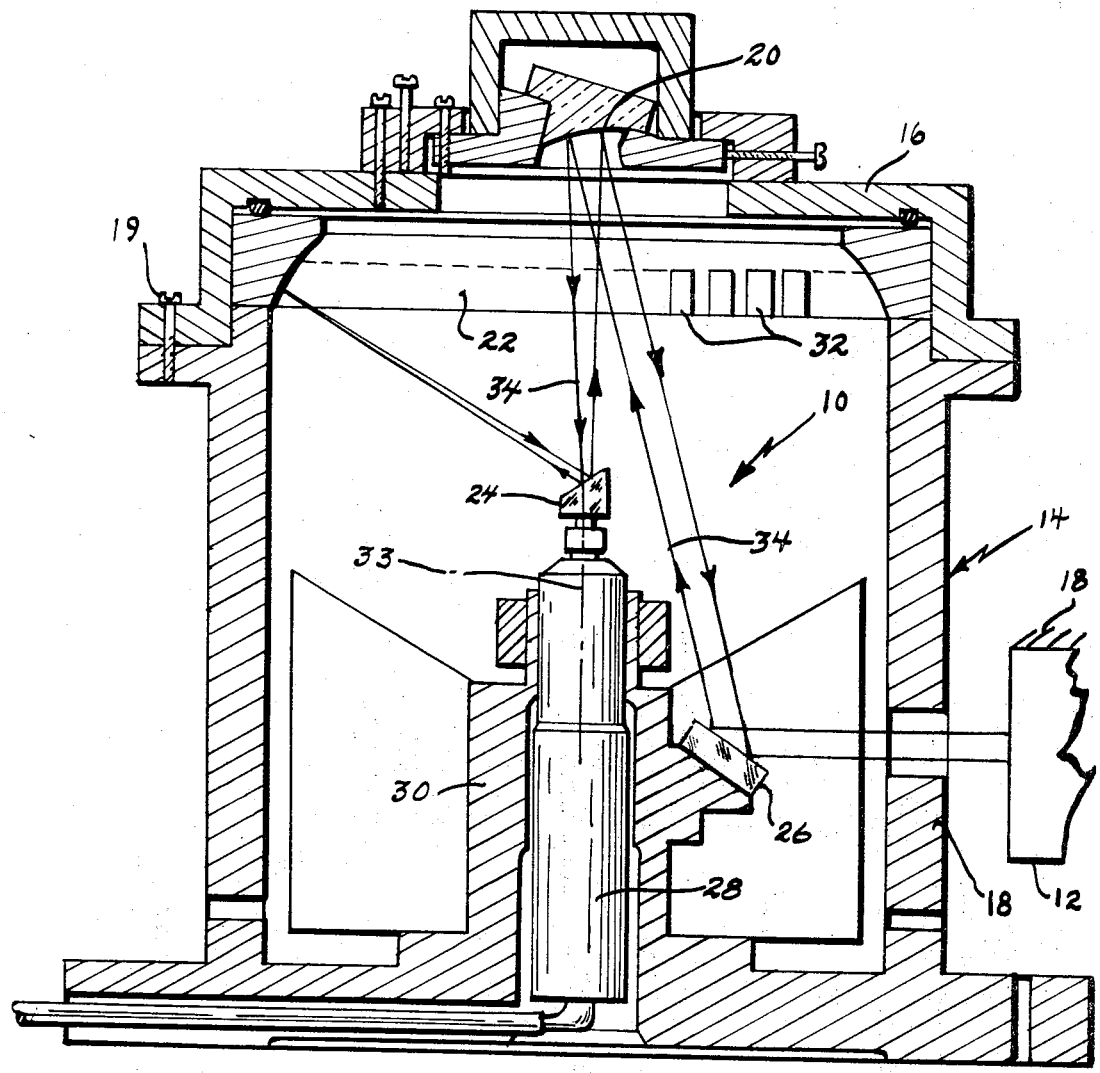
FIG. 1 is a side elevational view shown partly in cross-section of the Q-switch of this invention for use in the optical system of a laser.

The Q-switch 10 of this invention sets forth a novel arrangement of the central rotating reflector 24 and single spherical reflector 22. Reflector 24 is mounted for rotational movement on any suitable motor 28 such as a 20,000 RPM air motor. Motor 28 which drives reflector 24 at any desired rotational speed is fixedly mounted within an upstanding structure 30 within the lower section 18 of housing 14.

A spherical reflector 22 is fixedly positioned in the upper section 16 of housing 14. This reflector 22 is in the form of a ring and when interrupted by masks or slots produces a multireflector device. A plurality of reflective strips 32 are easily lined up, as each reflector 32 is part of a single spherical surface 22. If the intersection of the axis of rotation 33 of the rotating reflector 24 and its surface is exactly on the center of the spherical reflector 22, a beam 34 emanating from a suitable laser source 12 entering on the axis of rotation 33 and focused on the spherical reflector 22 will be constantly retro-reflected while the rotating reflector 24 spins around its axis of rotation.

Still referring to FIG. 1 of the drawing the slotted spherical ring reflector 22 is made of any suitable material such as brass, coated with electrodeless Nickel and polished to optical figure. In the same way, the focusing off-axis parabola 20 is made of Nickel coated brass. The electrodeless Nickel ring reflector surface 22 will withstand power densities of the focused beam 34 in the order of magnitude of hundreds of megawatts for the short durations involved. The laser source 12 as well as the reflector 20 and motor 28 is adjustably mounted in any conventional manner for any desired alignment.

For the Q-switch 10 of this invention to produce a 100 KHz repetition rate, for example, 300 reflective strips 32 and 20,000 RPM of rotating reflector 24 would be necessary. By merely raising the RPM rate of reflector 24 much higher repetition rates are easily achieved. The dwelling time on the individual reflectors 32 depends upon the width of the reflective strip 32 versus the diffraction limited spot size of the focusing of reflector 20.

FIGS. 2–4 represent a further improvement of the instant invention which permit an adjustable dwelling time without changing the repetition rate. For example, FIGS. 2 and 3 show a ring shaped masks 36 and 38 mounted for axial displacement within the spherical reflector 22. Masks 36 and 38 have a plurality of openings 40 and 42, respectively, therein arranged to provide interruptions of the focused beam 34 as it arrives at the spherical ring reflector 22. The width of these openings 40 and 42 vary in the form of steps as shown at 40 in FIG. 2 or as slopes as shown at 42 in FIG. 3 allowing for the incremental or continuous change of the dwelling time as the axial displacement of mask 36 takes place. This axial displacement may be accomplished by means of any conventional mechanical or electro-mechanical means (not shown).

FIG. 4 represents a further modification of this invention by providing a continuous array of triangular masks 44 formed from a thin flat spring material. The entire mask array 44 is secured to a ring 46 and mounted for axial displacement within spherical ring reflector 22. The free ends of mask 44 press against ring 22. Upon upward axial displacement of this mask array 44 the openings 48 between triangles 44 will narrow, shortening the dwell time.

It is therefore clearly seen that the repetition rate of the Q-switch 10 of this invention is not limited by the difficulties arising from the mass of components rotated at high speed such as has arisen with prior art devices. Furthermore the multi reflector Q-switch 10 of the instant invention is easily aligned as each reflector 32 is part of a single spherical surface 22.

Although this invention has been described with reference to a particular embodiment it will be understood to those skilled in the art that this invention is also capable of a variety of alternate embodiments within the spirit and scope of the appended claims.

I claim:

1. A Q-switch for use in the optical system of a laser comprising a laser for producing a laser beam, a housing located adjacent said laser having an opening therein optically aligned with the optical axis of said laser which allows for the passage of said laser beam therethrough, focusing means mounted within said housing in optical alignment with the optical axis of said laser for directing said laser beam to a central reflector, said central reflector being rotatably mounted in the central portion of said housing and being positioned at an angle to both the optical axis of said laser and to the axis of rotation of said central reflector, means for rotating said central reflector, means for retro-reflecting said laser beam including a spherical ring reflector mounted within said housing in optical alignment with said central reflector and the optical axis of said laser and means for interrupting said laser beam as it arrives at said spherical ring reflector, whereby said laser beam is directed by said focusing means to said central reflector and from said central reflector to said retro-reflecting means where it is constantly retro-reflected while said central reflector spins around its axis of rotation.

2. A Q-switch for use in the optical system of a laser as defined in claim 13 wherein the intersection of the axis of rotation and the surface of said central reflector is exactly in the center of said spherical reflector and said beam which is directed from said focusing means enters at the axis of rotation of said central reflector before being directed to said spherical reflector.

3. A Q-switch for use in the optical system of a laser as defined in claim 2 wherein said spherical reflector is made up of a plurality of reflective strips.

4. A Q-switch for use in the optical system of a laser as defined in claim 3 wherein said means for rotating said central reflector is capable of varying the rotational speed of said central reflector.

5. A Q-switch for use in the optical system of a laser as defined in claim 4 wherein said means for interrupting said laser beam is adjustable thereby changing the dwelling time of said beam on said spherical reflector.

6. A Q-switch for use in the optical system of a laser as defined in claim 5 wherein said spherical ring reflector is made of brass, coated with electrodeless Nickel.

7. A Q-switch for use in the optical system of a laser as defined in claim 5 wherein said means for interrupting said laser beam comprises a ring shaped mask having a plurality of openings therein and is capable of being moved in the axial direction.

8. A Q-switch for use in the optical system of a laser as defined in claim 7 wherein each of said openings vary in width.

9. A Q-switch for use in the optical system of a laser as defined in claim 8 wherein said mask is formed of a thin flat spring material.

10. A Q-switch for use in the optical system of a laser as defined in claim 9 wherein said openings are triangular in configuration.

* * * * *

UNITED STATES PATENT OFFICE
CERTIFICATE OF CORRECTION

Patent No. 3,769,608       Dated   Oct. 30, 1973

Inventor(s)   Leslie O. Vargady

It is certified that error appears in the above-identified patent and that said Letters Patent are hereby corrected as shown below:

Claim 2, line 2, "13" should read ---1---

Signed and sealed this 18th day of June 1974.

(SEAL)
Attest:

EDWARD M. FLETCHER, JR.
Attesting Officer

C. MARSHALL DANN
Commissioner of Patents